United States Patent

[11] 3,562,567

| [72] | Inventor | Eugene P. Carini |
| | | 800, 28th Ave., Vero Beach, Fla. 32960 |
| [21] | Appl No. | 6,840 |
| [22] | Filed | Jan. 29, 1970 |
| [45] | Patented | Feb. 9, 1971 |

[54] CYCLIC LOAD DRIVE
7 Claims, 2 Drawing Figs.

| [52] | U.S. Cl. | 310/83, 310/112 |
| [51] | Int. Cl. | H02k 7/00 |
| [50] | Field of Search | 310/112, 114, 83, 67, 49; 318/8, 45 |

[56] References Cited
UNITED STATES PATENTS

| 938,918 | 2/1909 | Tuch | 310/112 |
| 1,610,666 | 12/1926 | Farrell | 310/112 |

*Primary Examiner*—D. X. Sliney
*Attorney*—Fishman and Van Kirk

ABSTRACT: An electric drive system wherein the driven member comprises an integral unit including a plurality of electric motors, suitable torque transmitting means and means for intermittently delivering electric power to the motors. The electric motors are rigidly mounted to the periphery of the driven member, the motors thus rotating with the driven member.

PATENTED FEB 9 1971  3,562,567

INVENTOR
EUGENE P. CARINI

BY

ATTORNEY

CYCLIC LOAD DRIVE

BACKGROUND OF THE INVENTION

1. Field of the Invention

The present invention relates to an electric drive system. More particularly, the present invention is directed to the electric propulsion of rotating members. Accordingly the general objects of the present invention are to provide new and improved methods and apparatus of such character.

2. Description of the Prior Art

While not limited thereto in its utility, the present invention is particularly well suited for use as a drive system for machinery of the type which subjects the drive system to extremely high cyclic loads of short duration. Current drive systems have attempted to solve the problems associated with cyclic load through the use of oversized drive systems. Such systems, being rated to overcome the high cyclic loads, are very inefficient. Restated, the prior art drive systems cannot maintain a constant speed and therefore waste energy through constant acceleration and deceleration as the cyclic load varies.

Other prior art drive systems have attempted to make use of large, heavy flywheels to provide enough angular momentum to overcome high cyclic loading. Although successful in reducing the speed variation caused by cyclic loading, this alternative type of drive provides only a small increase in efficiency due to the power loss through the mechanical linkages between the machine and flywheel. In addition the flywheel requires additional space and increases the weight of the machinery thereby increasing transportation difficulties.

Attempts have been made to combine the flywheel and motive power source into one unit. While succeeding in reducing both the size and weight of the drive system the resulting motorized flywheel is quite complex and utilizes a plurality of gears and bearings to transmit torque from the motive power source through the flywheel to the output shaft of the drive system. These gears and bearings absorb power thereby reducing the efficiency of the drive system.

SUMMARY OF THE INVENTION

The present invention overcomes the foregoing and other disadvantages of the prior art and in so doing provides an electric drive system characterized by improved efficiency. The drive system of the present invention comprises a plurality of electric motors rigidly mounted on a rotating support member which, in turn, is rigidly mounted on an output shaft. The motors are equally spaced about the periphery of the support. In a preferred embodiment, each motor has a gear mounted on its output shaft. The motor drive gears engage a stationary ring gear such that their rotation causes the support member, electric motors, and shaft to rotate. Electric current is provided by means of a segmented commutator which cyclically supplies current to opposing motors thereby utilizing only two motors at any given time to provide power. This intermittent supply of current provides each motor with a cooling down period thereby reducing the running temperature of each motor and allowing the motors to be run at their maximum rating, thereby increasing the efficiency of each motor.

DESCRIPTION OF THE DRAWING

The present invention may be better understood and its numerous advantages will become apparent to those skilled in the art by reference to the accompanying drawings wherein like reference numerals refer to like elements in the various figures and in which.

DESCRIPTION OF THE PREFERRED EMBODIMENT

Figure 1:
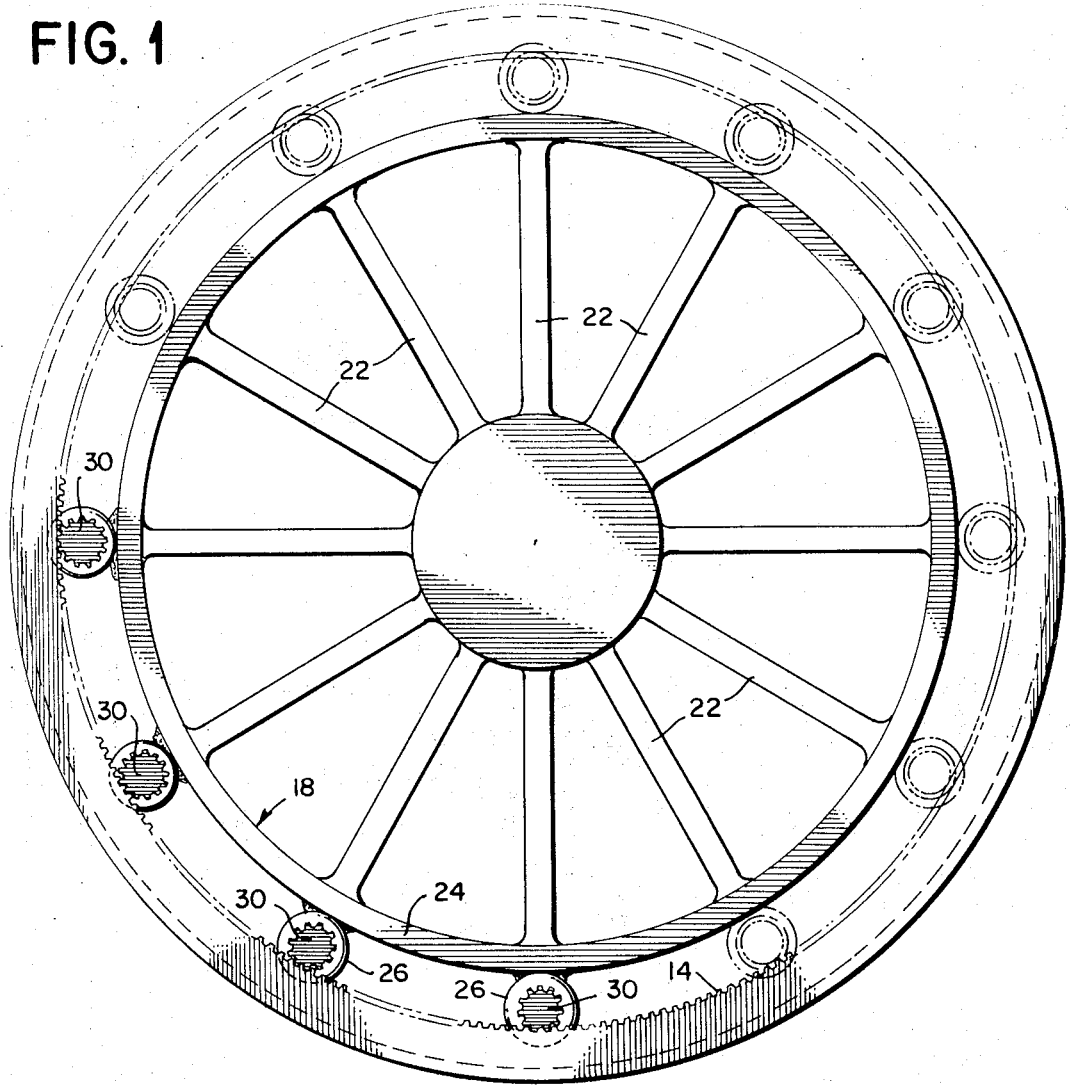
FIG. 1 is a top view of a preferred embodiment of the present invention.
Figure 2:
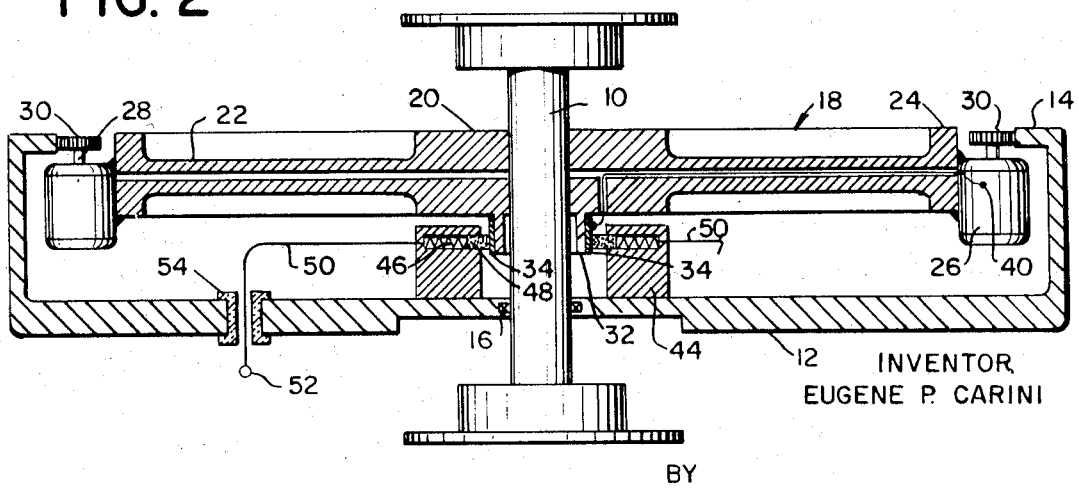
FIG. 2 is a side elevation view, partially in section, of the preferred embodiment of FIG. 1.

Referring simultaneously to FIGS. 1 and 2, a shaft 10 is rotatably mounted within a casing 12 and coaxial with a ring gear 14 located or formed on a flange 15 which extends from the periphery of the casing 12. The shaft 10 is supported by an annular bearing 16 pressed into the casing 12.

A motor support 18 is rigidly mounted on the shaft 10. The support 18 comprises a hub section 20, twelve equally spaced hollow spokes 22 radiating from the hub section 20, and an annular rim 24 supported by the spokes 22. At least a portion of the support 18 will typically be coplanar with the ring gear 14.

A plurality of electric motors 26 have their stators rigidly attached to the rim 24 of the support 18. There will be at least four motors and each motor 26 is mounted at the juncture of a spoke 22 and the rim 24 with the output shaft 28 of each motor 26 being oriented parallel to the shaft 10. Each output shaft 28 has a gear 30 keyed thereto. The gears 26 are coplanar with the support 18 and engage the ring gear 14.

A tubular commutator support 32 is mounted on shaft 10 adjacent to hub section 20 of the support 18. The commutator support 32 is coaxial with the shaft 10 and provides support for a segmented commutator 34. Preselected segments of commutator 34 are connected by means of electrical wiring 38, which passes through the hollow spokes 22, to a first polarity input terminal 40 of a corresponding motor 26. In the twelve motor embodiment disclosed, there will be one commutator segment electrically connected to each motor.

A pair of opposed brushes 42 are positioned within a nonconductive, tubular brush support 44. The brush support 44 is rigidly mounted on the lower portion of the casing 12 and is coaxial with the shaft 10. Each of brushes 42 is slidably positioned within a passage 46 formed in the brush support section 44. The passages 46 are perpendicular to the shaft 10 and coplanar with the commutator 34. A spring 48 located within each passage 46 positions each brush 42 such that contact is maintained between the brushes 42 and the commutator 34.

A conductor 50, which connects the springs 48 with a terminal 52 located on but insulated from the lower portion of the casing 10, passes through an insulated grommet 54 mounted in the lower casing 10.

During operation of the drive system, electric current will be delivered to terminal 52 by the closing of a suitable switch, not shown, which connects the terminal 52 to a first polarity terminal of a direct current source. The current passes from the terminal 52 through the conductor 50, springs 48 and brushes 42 to opposing segments on the commutator 34. The commutator 34 directs the current to the terminals 40 of a pair of oppositely disposed motors 26 through wiring 38 located within the spokes 22. The opposite polarity terminals of motors 26 are grounded to the motor support 18 which, being in electrical contact with the casing 12, completes the circuit.

The resultant torque supplied by the pair of motors 26 receiving current causes the motor support 18 to rotate thereby rotating the commutator 34, causing another set of opposing segments 36 to contact the brushes 42. In this manner current is cyclically supplied to the pairs of oppositely disposed motors 26, there being six pair in the disclosed embodiment, in such a manner that only one pair of opposing motors 26 is producing torque at any given moment.

Rotation of the support 18 and motors 26 results in a flywheel effect due to the high moment of inertia generated by the rotation of rim 24 and motors 26 about the shaft 10. This reduces the torque required to maintain revolution of the motor support 18 thereby reducing the power consumption of the drive system.

While a preferred embodiment has been shown various modifications and substitutions may be made without departing from the spirit and scope of the invention. Accordingly, it is to be understood that the present invention has been described by way of illustration and not limitation.

I claim:

1. A drive system comprising:
   stationary support means;
   a rotatable shaft coaxial with said support means;
   a rotatable motor support means rigidly affixed to said shaft;

at least two pair of electric motors equally spaced about the periphery of said motor support means;

means drivingly coupling the output shaft of each of said motors to said stationary support means; and means for intermittently supplying oppositely disposed electric motors with electric current.

2. A drive system as described in claim 1 wherein the stationary support means comprises:
   a casing; and
   a ring gear rigidly mounted on the upper portion of the casing.

3. A drive system as described in claim 1 wherein the electric motors are direct current machines mounted on the motor support means with the output shaft of each motor parallel to the rotatable shaft.

4. A drive system as described in claim 2 wherein the means drivingly coupling said output shaft of each electric motor to said ring gear comprises; gear means mounted on said motor output shafts, said gear means engaging said ring gear.

5.

5. A drive system as described in claim 1 wherein said means for intermittently supplying oppositely disposed electric motors with electric current comprises:
   segmented commutator means rigidly mounted on the motor support means;
   a pair of opposed brushes slidably mounted adjacent to the commutator means;
   means for positioning said brushes in contact with said commutator means;
   means for supplying electric current to said brushes; and
   means connected between individual segments of said commutator means and individual motors for transmitting electric current from each segment of said commutator to a corresponding motor.

6. A drive system as described in claim 4 wherein said means for intermittently supplying oppositely disposed electric motors with electric current comprises:
   segmented commutator means rigidly mounted on the motor support means;
   a pair of opposed brushes slidably mounted adjacent to the commutator means;
   means for positioning said brushes in contact with said commutator means;
   means for supplying electric current to said brushes; and
   means connected between individual segments of said commutator means and individual motors for transmitting electric current from each segment of said commutator to a corresponding motor.

7. A drive system as described in claim 6 wherein the electric motors are direct current machines mounted on the motor support means with the output shaft of each motor parallel to the rotatable shaft.